United States Patent
Osawa (10) Patent No.: US 9,268,196 B2
(45) Date of Patent: Feb. 23, 2016

(54) IMAGE CAPTURE APPARATUS, LIGHT EMITTING DEVICE, AND AND LIGHT EMISSION AMOUNT CALCULATION METHOD

(75) Inventor: Toshifumi Osawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 13/350,116

(22) Filed: Jan. 13, 2012

(65) Prior Publication Data
US 2012/0189290 A1     Jul. 26, 2012

(30) Foreign Application Priority Data
Jan. 26, 2011   (JP) ................................. 2011-014385

(51) Int. Cl.
*G03B 15/03*   (2006.01)
*G03B 7/16*    (2014.01)
*G03B 7/28*    (2006.01)
*H04N 5/225*   (2006.01)
*H04N 5/232*   (2006.01)

(52) U.S. Cl.
CPC .. *G03B 7/16* (2013.01); *G03B 7/28* (2013.01); *G03B 15/03* (2013.01); *G03B 2215/0596* (2013.01); *G03B 2217/002* (2013.01); *H04N 5/2256* (2013.01); *H04N 5/23209* (2013.01)

(58) Field of Classification Search
CPC ...... G03B 15/02; G03B 15/03; G03B 15/035; G03B 15/05
USPC ................................................... 396/108, 157
See application file for complete search history.

(56) References Cited

U.S. PATENT DOCUMENTS

2005/0213957 A1*   9/2005  Tokunaga ........................ 396/61
2008/0316355 A1*  12/2008  Fukugawa et al. ............. 348/364
2009/0245775 A1*  10/2009  Osawa ............................ 396/61

FOREIGN PATENT DOCUMENTS

JP    2005-275265       10/2005
JP    2009-246774 A     10/2009

OTHER PUBLICATIONS

Oct. 3, 2014 Japanese Office Action, without an English Translation, that issued in Japanese Patent Application No. 2011-014385.

* cited by examiner

*Primary Examiner* — Clayton E Laballe
*Assistant Examiner* — Fang-Chi Chang
(74) *Attorney, Agent, or Firm* — Cowan, Liebowitz & Latman, P.C.

(57) ABSTRACT

When information associated with an object distance cannot be acquired, an image capture apparatus sets a condition required to determine a reference area used to determine weighting coefficients for respective photometry areas from a plurality of photometry areas, based on photometric values of the plurality of photometry areas obtained by making preliminary light emission.

5 Claims, 8 Drawing Sheets

| PD1 | PD2 | PD3 | PD4 | PD5 | PD6 | PD7 |
|---|---|---|---|---|---|---|
| PD8 | PD9 | PD10 | PD11 | PD12 | PD13 | PD14 |
| PD15 | PD16 | PD17 | PD18 | PD19 | PD20 | PD21 |
| PD22 | PD23 | PD24 | PD25 | PD26 | PD27 | PD28 |
| PD29 | PD30 | PD31 | PD32 | PD33 | PD34 | PD35 |

| FOCAL LENGTH (f) | LVL0 |
|---|---|
| f < 40mm | STANDARD REFLECTED LIGHT AT 0.5m |
| 40mm ≤ f < 75mm | STANDARD REFLECTED LIGHT AT 0.8m |
| 75mm ≤ f < 100mm | STANDARD REFLECTED LIGHT AT 1.1m |
| 100mm ≤ f | STANDARD REFLECTED LIGHT AT 1.4m |

FIG. 9

| RR(i) | W(i) |
|---|---|
| RR(i) < −2 | 1 |
| −2 ≤ RR(i) < −0.5 | 5 |
| −0.5 ≤ RR(i) < 0 | 10 |
| 0 ≤ RR(i) < 0.2 | 12 |
| 0.2 ≤ RR(i) < 0.4 | 11 |
| 0.4 ≤ RR(i) < 0.6 | 10 |
| 0.6 ≤ RR(i) < 0.8 | 8 |
| 0.8 ≤ RR(i) < 1.0 | 6 |
| 1.0 ≤ RR(i) < 1.5 | 4 |
| 1.5 ≤ RR(i) < 2.0 | 2 |
| 2.0 ≤ RR(i) | 0 |

FIG. 10

IMAGE CAPTURE APPARATUS, LIGHT EMITTING DEVICE, AND AND LIGHT EMISSION AMOUNT CALCULATION METHOD

BACKGROUND OF THE INVENTION

1. Field of the Invention

The present invention relates to an image capture apparatus which can capture an image while controlling a light-emitting device to emit light.

2. Description of the Related Art

Various techniques for optimizing flash light emission control at a flash image capture timing of an image capture apparatus such as a camera or mobile phone have been proposed. Especially, many methods of determining a main light emission amount by preliminarily emitting flash light prior to an exposure operation, and measuring reflected light of the preliminarily emitted light from an object for a plurality of photometry areas have been proposed. This is because appropriate light emission amounts can be determined for various scenes by determining a main light emission amount by a predetermined algorithm based on photometry results of the plurality of photometry areas.

Japanese Patent Laid-Open No. 2005-275265 has proposed the following image capture method, so as to stably obtain an appropriate exposure amount. Ratios $R(i)$ between photometric values $P(i)$ of respective photometry areas immediately before preliminary light emission and photometric values $H(i)$ of the respective photometry areas during preliminary light emission are calculated for respective photometry areas. A maximum one of the obtained ratios $R(i)$ is extracted as a reference value baseR, and weighting coefficients $W(i)$ for respective areas are determined by comparing the values $R(i)$ of the respective areas with the reference value baseR. Reflected light amounts of the respective areas at the time of preliminary light emission are weighted and averaged according to the weighting coefficients $W(i)$, and a main light emission amount is calculated based on the obtained weighted averaging result.

With the technique described in Japanese Patent Laid-Open No. 2005-275265, a value LVL0 corresponding to a maximum reflected light amount and a value LVL1 corresponding to a minimum reflected light amount at the time of preliminary light emission are calculated according to image capture distances to an object. Of photometry areas having luminance values $D(i)$ of only reflected light components at the time of preliminary light emission, which fall within a range between the values LVL0 and LVL1, one having the maximum ratio $R(i)$ is determined as a principal object area, and the ratio $R(i)$ of that area is extracted as the reference value baseR. With this method, stable exposure amounts can be obtained in many normal scenes. In addition, even when an image in an identical scene is captured by slightly changing a composition, an image capture result with a small change in exposure amount can be obtained. As image capture distance information to an object, when an image capture lens has a distance encoder, that information is acquired based on the distance encoder information. However, when an image capture lens does not have any distance encoder, an empirically determined assumed distance is used.

When the image capture lens does not have any distance encoder, and when the assumed distance is largely different from a distance to a principal object, the ratio $R(i)$ calculated from the reflected light amount from the principal object area cannot fall within the range between the values LVL0 and LVL1, and an appropriate exposure amount cannot often be obtained at an image capture timing. More specifically, when an image is captured in a state in which the distance to a principal object is smaller than the assumed distance, since the ratio $R(i)$ of the principal object area becomes larger than the value LVL0, a weighting coefficient $W(i)$ for that area is reduced. For this reason, the calculated main light emission amount of a light-emitting device is excessive for the principal object, and the principal object is overexposed consequently.

SUMMARY OF THE INVENTION

The present invention has been made in consideration of the aforementioned problems, and calculates an appropriate main light emission amount when information associated with an object distance cannot be obtained.

According to the first aspect of the present invention, there is provided an image capture apparatus, which allows to capture an image while controlling a light-emitting device to emit light, comprising: a photometry unit which acquires photometric values of a plurality of photometry areas; an acquisition unit which acquires information associated with an object distance; a determination unit which determines weighting coefficients for the plurality of photometry areas; and a calculation unit which calculates a main light emission amount of the light-emitting device by weighting the photometric values of the plurality of photometry areas according to the weighting coefficients determined by the determination unit, wherein when the acquisition unit cannot acquire the information, the determination unit sets a condition required to determine a reference area used to determine the weighting coefficients from the plurality of photometry areas, based on photometric values of the plurality of photometry areas obtained by controlling the light-emitting device to preliminarily emit light.

According to the second aspect of the present invention, there is provided a light emission amount calculation method comprising: a photometric value acquisition step of acquiring photometric values of a plurality of photometry areas from a photometry unit; an information acquisition step of acquiring information associated with an object distance; a determination step of determining weighting coefficient for the plurality of photometry areas; and a calculation step of calculating a main light emission amount by weighting the photometric values of the plurality of photometry areas according to the weighting coefficients determined in the determination step, wherein in the determination step, when the information cannot be acquired in the information acquisition step, a condition required to determine a reference area used to determine the weighting coefficients from the plurality of photometry areas is set based on photometric values of the plurality of photometry areas obtained by controlling a light-emitting device to preliminarily emit light.

Further features of the present invention will become apparent from the following description of exemplary embodiments with reference to the attached drawings.

DESCRIPTION OF THE EMBODIMENTS (First Embodiment)

Figure 1:
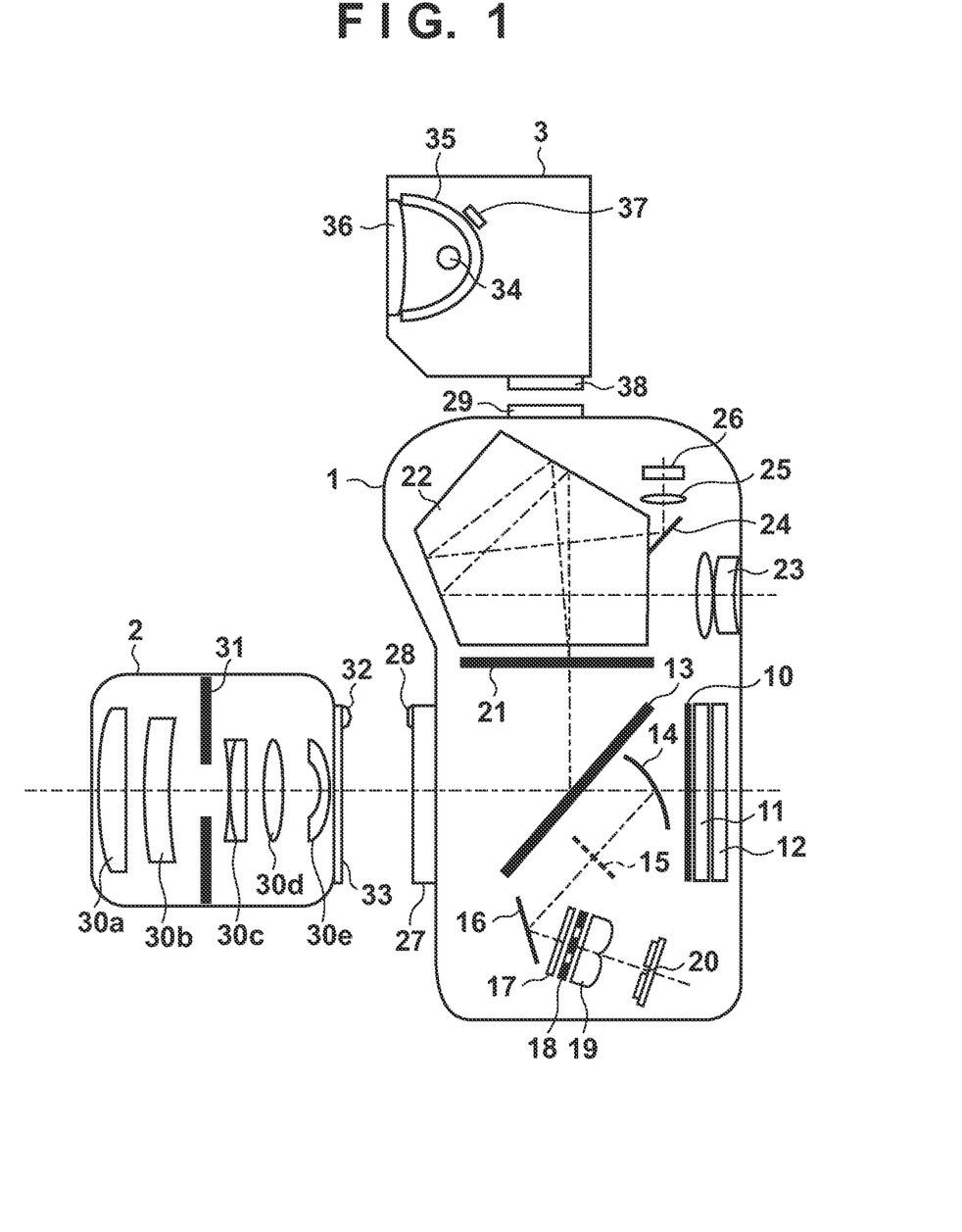
FIG. 1 is a view showing the arrangement of a camera, image capture lens, and flash device according to the first embodiment of the present invention.
Figure 2:
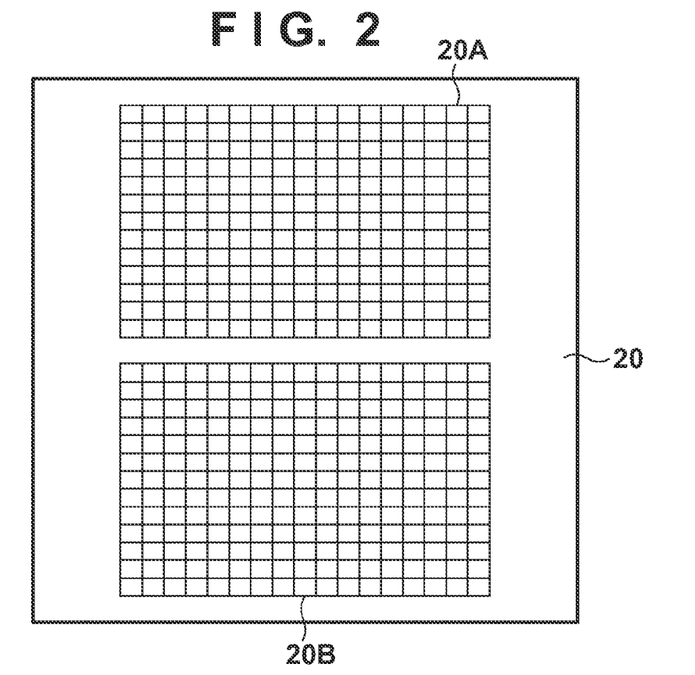
FIG. 2 is a view showing the arrangement of a focus detection sensor.

FIG. 1 mainly shows the arrangement of optical members, sensors, and the like in a camera as an image capture apparatus according to the first embodiment of the present invention. FIG. 1 shows the arrangement of a so-called single-lens reflex camera with an interchangeable lens. In FIG. 1, reference numeral 1 denotes a camera body; 2, an image capture lens; and 3, a flash device as a light-emitting device. In the camera body 1, reference numeral 10 denotes a mechanical shutter; 11, a low-pass filter; and 12, an image capture element such as a CMOS sensor or CCD, which includes, for example, an area accumulation type photoelectric conversion element. Reference numeral 13 denotes a semitransparent main mirror; and 14, a first reflecting mirror. Both the main mirror 13 and first reflecting mirror 14 are flipped upward at an image capture timing. Reference numeral 15 denotes a paraxial imaging plane which is conjugate with an image capture element plane formed by the first reflecting mirror 14; 16, a second reflecting mirror; 17, an infrared cut filter; 18, a stop having two apertures; 19, a secondary imaging lens; and 20, a focus detection sensor (to be referred to as an AF sensor hereinafter). The AF sensor 20 is configured by, for example, a pair of light-receiving sensor units 20A and 20B, which include area accumulation type photoelectric conversion elements such as CMOS sensors or CCDs, and are numerously divided in correspondence with the two apertures of the stop 18, as shown in FIG. 2. In addition to the light-receiving sensor units 20A and 20B, a signal accumulation unit, peripheral circuits for signal processing, and the like are formed on a single chip as an integrated circuit. The arrangement from the first reflecting mirror 14 to the AF sensor 20 is a known arrangement, which allows focus detection at arbitrary positions within an image capture frame by an image displacement method.

Figure 3:
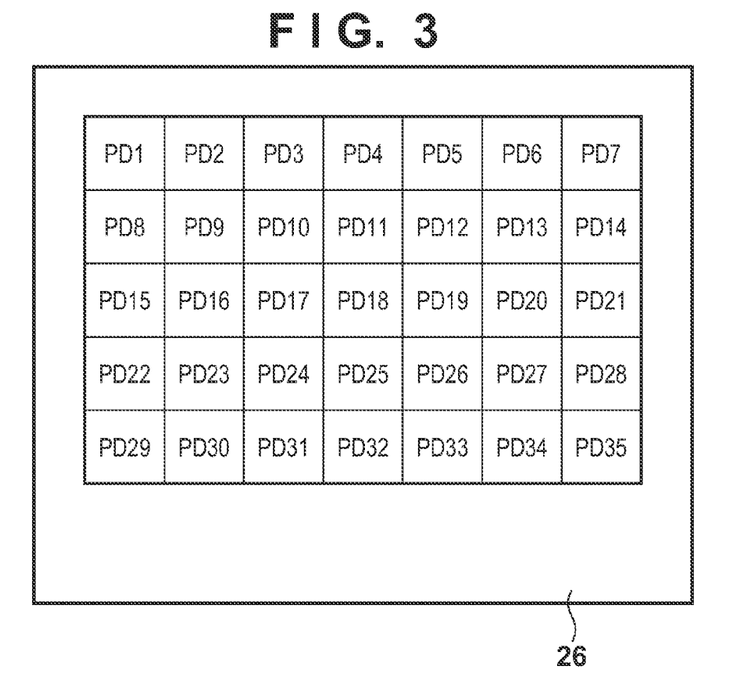
FIG. 3 is a view showing the arrangement of a photometry sensor.

Reference numeral 21 denotes a focusing screen having diffuseness; 22, a pentagonal prism; 23, an eyepiece; 24, a third reflecting mirror; 25, a condenser lens; and 26, a photometry sensor required to obtain information associated with a luminance of an object (to be referred to as an AE sensor hereinafter). The AE sensor 26 has a light-receiving sensor unit which includes, for example, photoelectric conversion elements such as silicon photodiodes, and is divided into a plurality of areas in a grid pattern, as exemplified in FIG. 3, and nearly the entire image capture frame is used as a visual field. As shown in FIG. 3, in this embodiment, the light-receiving visual field is divided into 35 areas (7 columns×5 rows). These 35-divided photometry areas will be referred to as PD1 to PD35 hereinafter. As is known, in addition to the light-receiving sensor unit, signal amplifiers, peripheral circuits for signal processing, and the like are formed on a single chip as an integrated circuit.

The focusing screen 21, pentagonal prism 22, and eyepiece 23 configure a viewfinder optical system. The AE sensor 26 receives some off-axial rays of those which are reflected by the main mirror 13 and are diffused by the focusing screen 21.

Figure 4:
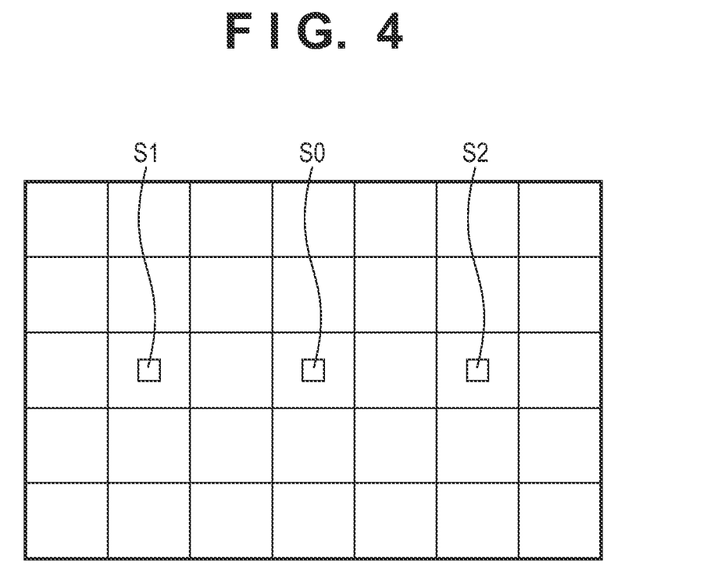
FIG. 4 is a view showing an example of focus detection positions.

FIG. 4 is a view showing the corresponding positional relationship between focus detection areas in the image capture frame by a focus detection means having the AF sensor 20 and the like, and the 35-divided photometry areas of the AE sensor 26. In the example of this embodiment, the focus detection areas in the image capture frame are set at three points S0 to S2, and the focus detection area S0 is set at a position corresponding to the photometry area PD18 of the AE sensor 26. Furthermore, as shown in FIG. 4, assume that the focus detection area S1 is set at a position corresponding to the photometry area PD16 of the AE sensor 26, and the focus detection area S2 is set at a position corresponding to the photometry area PD20 of the AE sensor 26. Note that the number of the photometry areas of the AE sensor 26 and the number of focus detection areas shown in FIGS. 2 to 4 are merely examples, and the present invention is not limited to them.

The description will revert to FIG. 1. Reference numeral 27 denotes a mount to which the image capture lens 2 is attached; 28, contacts required to make information communications with the image capture lens 2; and 29, a connector used to mount the flash device 3. In the image capture lens 2, reference numerals 30a to 30e denote optical lenses which configure the image capture lens 2; 31, a stop; 32, contacts required to make information communications with the camera body 1; and 33, a mount used to be attached to the camera body 1.

In the flash device 3, reference numeral 34 denotes a xenon tube; 35, a reflector; 36, a condensing Fresnel lens; 37, a monitor sensor required to monitor an light emission amount of the xenon tube 34; and 38, an attachment used to attach the flash device 3 to the camera body 1.

Figure 5:
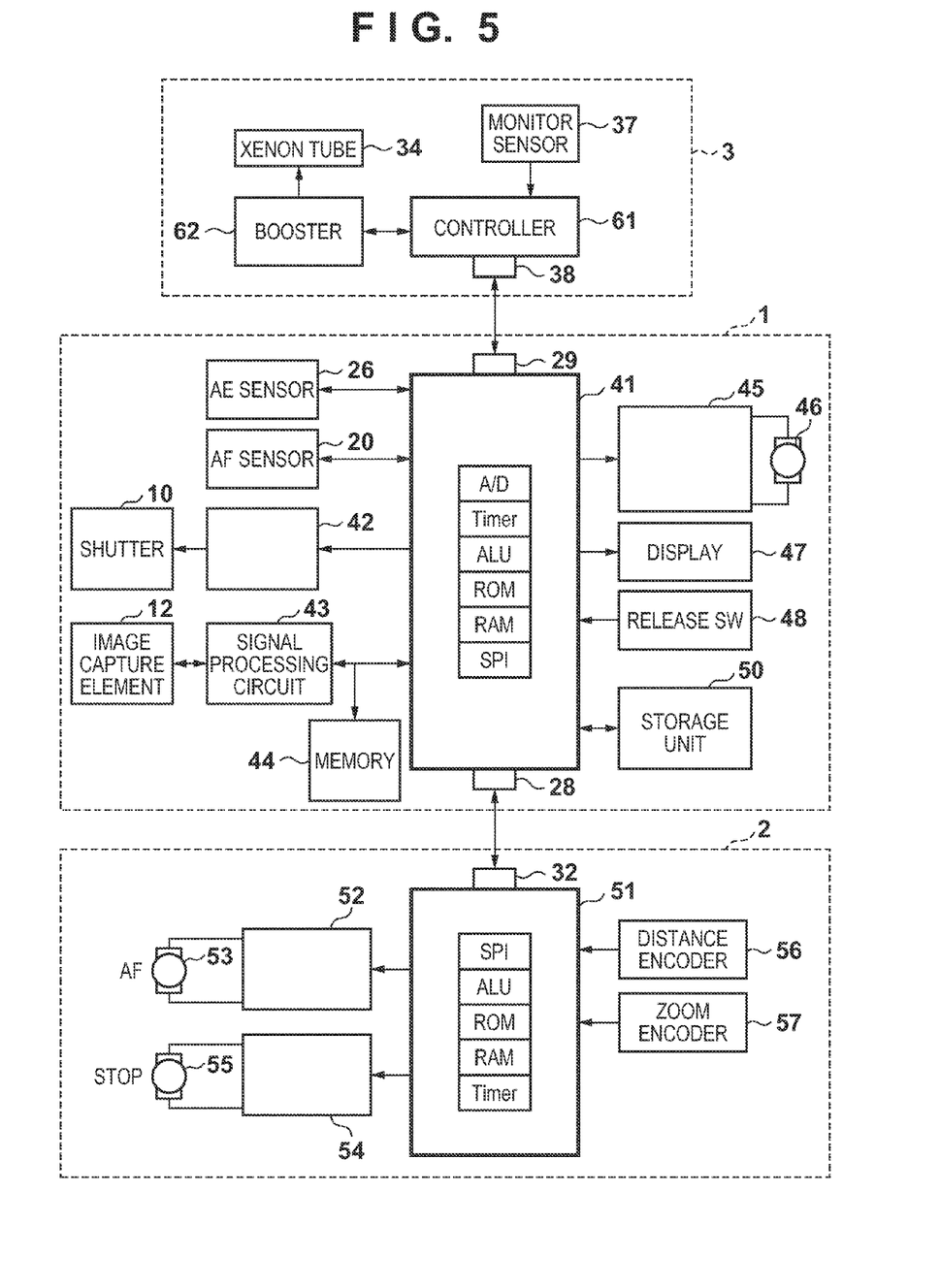
FIG. 5 is a block diagram showing an example of the arrangements of electrical circuits of the camera, image capture lens, and flash device.

FIG. 5 is a block diagram showing an example of the arrangements of electrical circuits of the camera body 1, image capture lens 2, and flash device 3 according to this embodiment. In the camera body 1, reference numeral 41 denotes a controller by means of a one-chip microcomputer which includes, for example, an ALU, ROM, RAM, A/D converter, timer, serial communication port (SPI), and the like. The controller 41 executes overall control of a camera mechanism and the like. A practical control sequence of the controller 41 will be described later. The AF sensor 20 and AE sensor 26 are the same as those described in FIG. 1 and the like. Output signals of the AF sensor 20 and AE sensor 26 are connected to an A/D converter input terminal of the controller 41.

Reference numeral 42 denotes a shutter driving unit, which is connected to an output terminal of the controller 41, and drives the mechanical shutter 10 described in FIG. 1. Reference numeral 43 denotes a signal processing circuit, which controls the image capture element 12 according to an instruction from the controller 41 to receive a captured image signal output from the image capture element 12 while A/D-converting it, and to execute signal processing of that signal, thereby obtaining an image signal. Also, upon recording the obtained image signal, the signal processing circuit 43 executes required image processing such as compression. Reference numeral 44 denotes a memory such as a DRAM, which is used as a work memory when the signal processing circuit 43 executes various kinds of image processing, and also as a VRAM when an image is displayed on a display 47 (to be described later). Reference numeral 45 denotes a first motor driver, which is connected to an output terminal of the controller 41 to be controlled by the controller 41, moves the main mirror 13 and first reflecting mirror 14 upward and downward, and charges the mechanical shutter 10. Reference numeral 47 denotes a display which includes a liquid crystal panel or the like, and displays various kinds of image capture information and a captured image, and undergoes illumination control by the controller 41. Reference numeral 48 denotes a release switch. Reference numeral 50 denotes a storage unit such as a flash memory or optical disk, which stores captured image signals. Reference numeral 28 denotes the contacts with the image capture lens 2, which are described in FIG. 1, and to which input/output signals of the serial communication port of the controller 41 are connected. Reference numeral 29 denotes the connector to which the flash device is attached, as described in FIG. 1, and input/output signals of the serial communication port of the controller 41 are also connected so as to allow communications with the flash device 3.

In the image capture lens 2, reference numeral 51 denotes a lens controller by means of a one-chip microcomputer which includes, for example, an ALU, ROM, RAM, timer, serial communication port (SPI), and the like. Reference numeral 52 denotes a second motor driver, which is connected to an output terminal of the lens controller 51 to be controlled by the lens controller 51, and to drive a second motor 53 required to attain focus adjustment. Reference numeral 54 denotes a third motor driver, which is connected to an output terminal of the lens controller 51 to be controlled by the lens controller 51, and to drive a third motor 55 required to control the stop 31 described in FIG. 1. Reference numeral 56 denotes a distance encoder, which is required to obtain information associated with an extension amount of a focus adjustment lens, that is, an object distance, and is connected to an input terminal of the lens controller 51. Reference numeral 57 denotes a zoom encoder, which is required to obtain focal length information at an image capture timing when the image capture lens 2 is a zoom lens, and is connected to an input terminal of the lens controller 51. Reference numeral 32 denotes the contacts, which are described in FIG. 1, and to which input/output signals of the serial communication port of the lens controller 51 are connected.

When the image capture lens 2 is mounted on the camera body 1, the contacts 28 and 32 are connected to allow the lens controller 51 to make data communications with the controller 41 of the camera body. Optical information unique to the lens, and information associated with an object distance or focal length information based on the distance encoder 56 or zoom encoder 57, which are required for the controller 41 of the camera body to execute focus detection and exposure calculation operations, are output from the lens controller 51 to the controller 41. Also, focus adjustment information and aperture information, which are calculated as a result of the focus detection and exposure calculation operations executed by the controller 41 of the camera body, are output from the controller 41 to the lens controller 51. Then, the lens controller 51 controls the second motor driver 52 in accordance with the focus adjustment information, and controls the third motor driver 54 in accordance with the aperture information.

In the flash device 3, reference numeral 61 denotes a flash controller by means of a one-chip microcomputer which includes, for example, an ALU, ROM, RAM, A/D converter, timer, serial communication port (SPI), and the like. Reference numeral 62 denotes a booster, which has a function of generating a high voltage of about 300 V required for the xenon tube 34 to emit light, and charging that high voltage. The xenon tube 34 and monitor sensor 37 are the same as those described in FIG. 1. When the flash device 3 is mounted on the camera body 1, their connectors 38 and 29 are connected to allow the flash controller 61 to make data communications with the controller 41 of the camera body. The flash controller 61 controls the booster 62 in accordance with communication contents from the controller 41 of the camera body to start and stop light emission of the xenon tube 34, and outputs a detection amount of the monitor sensor 37 to the controller 41 of the camera body.

Figure 6:
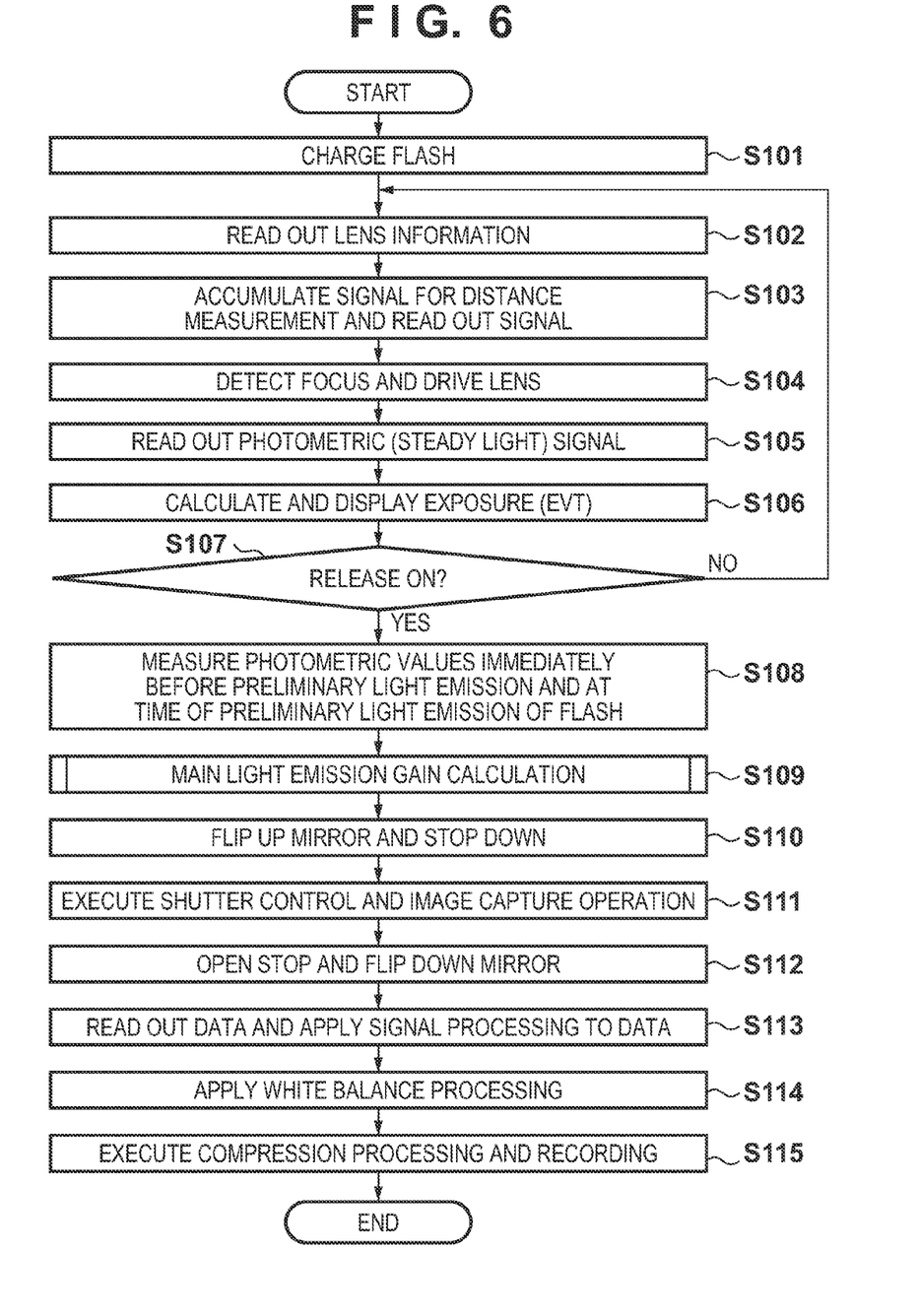
FIG. 6 is a flowchart showing the operation of the camera.

The practical operation sequence of the controller 41 of the camera body will be described below with reference to the flowchart shown in FIG. 6. When a power switch (not shown) is turned on to enable the controller 41, the controller 41 executes processing from step S101 in FIG. 6.

In step S101, prior to an exposure operation of the image capture element 12, the controller 41 communicates with the flash controller 61, and instructs it to operate the booster 62 and to charge a high voltage enough to emit flash light. In step S102, the controller 41 communicates with the lens controller 51 to obtain various kinds of lens information required for distance measurement and photometry. In step S103, the controller 41 outputs a control signal to the AF sensor 20 to accumulate signals. Upon completion of accumulation, the controller 41 A/D-converts signals accumulated on the AF sensor 20 while reading them out. Furthermore, the controller 41 applies various required data correction processes such as shading to loaded digital data.

In step S104, the controller 41 receives lens information required for focus detection and the like from the lens controller 51, and calculates focus states of the respective focus detection areas based on the received lens information and the digital data obtained from the AF sensor 20. Furthermore, the controller 41 determines an area to be focused from the areas S0 to S2. If there is an area designated in advance by an operation member or the like, the controller 41 may select that area. The controller 41 calculates a lens moving amount required to attain an in-focus state in accordance with the focus state of the determined area, and outputs the calculated lens moving amount to the lens controller 51. The lens controller 51 outputs a signal to the second motor driver 52 to drive the second motor 53 according to this lens moving amount, thereby driving the focus adjustment lens. In this way, the image capture lens is set in an in-focus state with respect to an object. Since information of the distance encoder 56 changes by driving the focus adjustment lens, the lens controller 51 also updates various kinds of lens information.

In step S105, the controller 41 receives pieces of luminance information of the respective photometry areas while reading out and A/D-converting signals of the 35-divided photometry areas PD1 to PD35 from the AE sensor 26. Furthermore, the controller 41 receives required lens information and the like from the lens controller 51 and corrects the pieces of received luminance information of the respective photometry areas, thus obtaining the pieces of luminance information of the respective photometry areas.

In step S106, the controller 41 calculates luminance information of the overall frame by weighting pieces of luminance information of the photometry areas corresponding to the focus detection positions based on the pieces of obtained luminance information of the respective photometry areas. The controller 41 determines an accumulation time (that is, a shutter speed) of the image capture element 12 and an aperture value, which are optimal to capture an image, from a predetermined program diagram based on the luminance information of the overall frame, which is calculated in this way, and displays them on the display 47. When one of the shutter speed and aperture value is preset, the other parameter which can attain an optimal exposure in combination with that preset value is determined. Note that let EVT be an exposure value based on determined apex values of the shutter speed and aperture value.

$$EVT=Tv+Av$$

where Tv is an apex value of the shutter speed, and Av is that of the aperture value.

In step S107, the controller 41 waits until the user turns on a release switch 49. If the release switch 49 is not turned on, the process returns to step S102. If the release switch 49 is turned on, the process advances to step S108.

In step S108, the controller 41 receives pieces of luminance information immediately before preliminary light emission of the respective photometry areas while reading out and A/D-converting signals of the 35-divided photometry areas PD1 to PD35 from the AE sensor 26. Let P(i) be the pieces of luminance information immediately before preliminary light emission of the respective photometry areas. Then, the controller 41 communicates with the flash controller 61 to instruct it to execute preliminary light emission of the flash. Then, the flash controller 61 controls the xenon tube 34 to emit light by a predetermined preliminary light emission amount based on an output signal from the monitor sensor 37. In order to obtain object luminance information while this preliminary light emission is executed (during the preliminary light emission operation), the controller 41 receives pieces of luminance information at the time of preliminary light emission of the respective photometry areas while reading out and A/D-converting signals of the 35-divided photometry areas PD1 to PD35 from the AE sensor 26. Let H(i) be pieces of luminance information at the time of preliminary light emission of the respective photometry areas. Note that in this case, i=1 to 35 corresponding to the 35-divided photometry areas.

In step S109, the controller 41 makes calculations to determine a main light emission amount of the flash device 3. The practical calculation processing will be described later with reference to the flowchart shown in FIG. 7.

In step S110, the controller 41 outputs a control signal to the first motor driver 45 to drive the first motor 46, thereby flipping the main mirror 13 and first reflecting mirror 14 upward. Subsequently, the controller 41 outputs the aperture value information calculated in step S106 to the lens controller 51. The lens controller 51 outputs a signal to the third motor driver 54 to drive the third motor 55, thereby driving the stop 31 in accordance with this information. As a result, the image capture lens is set in a stopped-down state.

In step S111, the controller 41 outputs a signal to the shutter driving unit 42 to set the shutter 11 in a full-open state. In this manner, a light beam via the image capture lens 2 enters the image capture element 12, thus allowing to capture an image. The controller 41 issues an instruction to the signal processing circuit 43 to set an accumulation time of the image capture element 12 in accordance with the shutter speed calculated in step S106, and to control the image capture element 12 to capture an image. Also, the controller 41 supplies a light emission instruction to the flash controller 61 in synchronism with this image capture timing. In accordance with the light emission instruction, the flash controller 61 controls the xenon tube 34 to emit light based on an output signal from the monitor sensor 37 to attain a light emission amount corresponding to G (which will be described later) calculated in step S109. Then, an image is captured with light emitted by the flash device 3. Upon completion of the image capture operation, the controller 41 outputs a signal to the shutter driving unit 42 to set the shutter 11 in a light-shielding state.

Then, a light beam via the image capture lens 2 is shielded with respect to the image capture element 12.

In step S112, the controller 41 outputs information to the lens controller 51 to set the stop 31 in a full-open state. The lens controller 51 outputs a signal to the third motor driver 54 to drive the third motor 55, thereby driving the stop 31 according to this information. Then, the image capture lens is set in a stop full-open state. Furthermore, the controller 41 outputs a control signal to the first motor driver to drive the first motor 46, thereby flipping the main mirror 13 and first reflecting mirror 14 downward.

In step S113, the controller 41 issues an instruction to the signal processing circuit 43 to execute required correction processing and interpolation processing while reading out and A/D-converting captured image information from the image capture element 12.

In step S114, the controller 41 issues an instruction to the signal processing circuit 43 to apply white balance adjustment to the captured image information. More specifically, in the captured image information, one frame is divided into a plurality of areas, and a white area of an object is extracted based on color difference signals for respective areas. Furthermore, based on a signal of the extracted area, gain correction of red and blue channels of the entire frame is executed, thus attaining the white balance adjustment.

In step S115, the controller 41 issues an instruction to the signal processing circuit 43 to compress and convert the captured image information, which has undergone the white balance adjustment, into a recording file format, and to store the converted information in the memory 44. Thus, an image capture sequence is complete.

The calculation processing for determining the main light emission amount of the flash device 3 in step S109 will be described below with reference to the flowchart shown in FIG. 7.

In step S151, the controller 41 calculates luminance values D(i) of only reflected light components at the time of preliminary light emission (to be referred to as reflected light luminance values D(i) hereinafter) based on the luminance values P(i) (photometric values) immediately before preliminary light emission and the luminance values H(i) (photometric values) at the time of preliminary light emission of the respective photometry areas of the AE sensor 26. Since the luminance values P(i) immediately before preliminary light emission and the luminance values H(i) at the time of preliminary light emission are those in a compressed system, the powers of P(i) and H(i) are calculated and expanded, and their differences are calculated and logarithmically compressed to make a calculation given by:

$$D(i)=\log_2(2^{H(i)}-2^{P(i)})$$

where i=1 to 35 corresponding to the respective 35-divided photometry areas.

In step S152, the controller 41 calculates luminance value ratios R(i) based on the luminance values P(i) immediately before preliminary light emission and the luminance values H(i) at the time of preliminary light emission of the respective photometry areas of the AE sensor 26:

$$R(i)=H(i)-P(i)$$

Since the luminance values P(i) immediately before preliminary light emission and the luminance values H(i) at the time of preliminary light emission are those in the compressed system, calculating their differences is equivalent to calculating luminance value ratios. The reason why the luminance value ratios are calculated is that areas where luminance value ratio values match of the 35-divided photometry areas of the AE sensor can be considered as those where distances to an object match, as described in Japanese Patent Laid-Open No. 2005-275265.

In step S153, the controller 41 calculates a predetermined value LVL0 corresponding to a maximum reflected light amount and a predetermined value LVL1 corresponding to a minimum reflected light amount, which are estimated from information of an object distance (first calculation). The value LVL0 is calculated from information of the distance encoder 56 obtained from the lens controller 51 in step S102, that is, information D associated with an object distance, and information C2 associated with a light emission amount at the time of preliminary light emission, in consideration of a reflected light amount obtained when an object having a standard reflectance is located at that object distance. The value LVL0 is determined to be slightly higher than luminance values of only reflected light components at the time of preliminary light emission, which are assumed when an object having a standard reflectance is located at an object distance based on information D associated with the object distance (to be referred to as distance information D hereinafter). This is to set, in consideration of the fact that the object distance based on the distance information D has a slight error in practice, the value LVL0 to be higher by that error, and to prevent the luminance values of only reflected light components at the time of preliminary light emission on the object having the standard reflectance from becoming higher than the value LVL0.

$$LVL0 = -\log_2(D) \times 2 + C2$$

On the other hand, the value LVL1 is determined by subtracting C3 from the value LVL0. C3 is determined in consideration of an error of the distance information D and the like, so as to prevent the luminance values of only reflected light components at the time of preliminary light emission on the object having the standard reflectance from falling below the value LVL1.

$$LVL1 = LVL0 - C3$$

In this way, based on the distance information D, the following calculations for determining a main light emission amount are made under the precondition that the luminance values of only reflected light components at the time of preliminary light emission normally fall within a predetermined range having the value LVL0 as an upper limit value, and the value LVL1 as a lower limit value.

Note that in case of a single-lens reflex camera with an interchangeable lens, since some mounted lens does not have any distance encoder 56, the distance information D cannot often be obtained. Calculation methods of the upper limit value LVL0 and lower limit value LVL1 of the predetermined range in this case will be described below.

Figure 8:
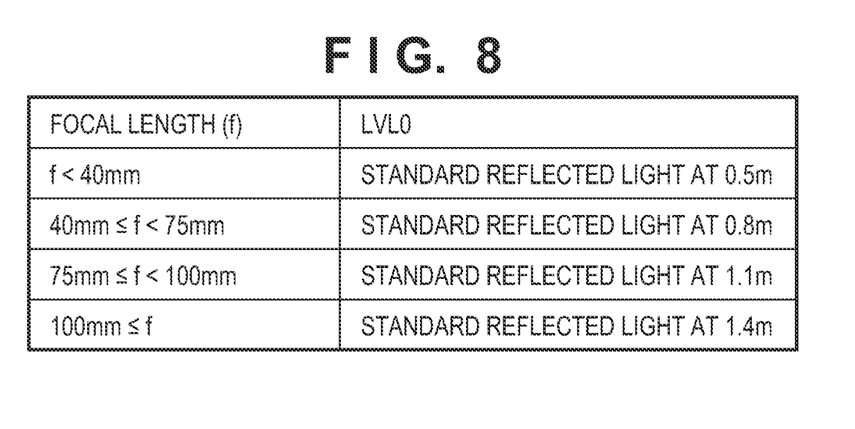
FIG. 8 is an explanatory view of an LVL0 determination table.

Initially, the value LVL0 is determined with reference to table1 shown in FIG. 8 based on focal length information of the image capture lens.

$$LVL0 = table1(f)$$

For example, when the focal length of the image capture lens is 28 mm, the value LVL0 is determined based on the same concept as that when the distance information D is obtained to have a distance=0.5 m as a distance (assumed distance) where an object is located. In general, when an image is to be captured in a state in which the focal length is 28 mm, a frequency of capturing an image of an object at a close distance smaller than 0.5 m as a principal object is very low. In most of cases, the luminance values of only reflected light components at the time of preliminary light emission in practice become lower than the value LVL0. Based on the same concept, table1 in FIG. 8 is configured by setting the value LVL0 to have a distance=0.8 m as a distance where an object is located in case of an image capture lens having a focal length=50 mm. Note that in this embodiment, as shown in FIG. 8, the values LVL0 are associated with the focal lengths of image capture lenses which are delimited at certain steps. Alternatively, the values LVL0 may be calculated using a function expression using focal lengths.

On the other hand, the lower limit value LVL1 of the predetermined range when the distance information D cannot be obtained is calculated by subtracting C1 from the upper limit value LVL0. C1 is determined based on the same concept as that when the distance information D is obtained. For example, when an image is to be captured in a state in which a focal length is 50 mm, a frequency of capturing an image of an object at a far distance larger than 6.4 m as a principal object is very low. For this reason, since reflected light from an object at 6.4 m is lower by six levels than that at a distance=0.8 m upon determination of the value LVL0, C1 is set to be 6.

$$LVL1 = LVL0 - C1$$

Note that both the values LVL0 and LVL1 are those in the compressed system.

The controller 41 discriminates in step S154 whether or not the currently mounted image capture lens 2 is of a type that does not have any distance encoder 56. This can be discriminated by checking whether or not various kinds of lens information acquired in step S102 include the distance information D. If the distance information D is not included, the process advances to step S155.

In step S155, the controller 41 calculates an average value of top n larger values of the reflected light luminance values D(i) of the respective photometry areas calculated in step S151. The value of n is determined to be, for example, 10, so that it assures an area ratio of about 20% or higher with respect to the number of divisions of the AE sensor 26. This is because it is not preferable to make a re-calculation of the predetermined value LVL0, which will be described in step S157 later, under a condition that some limited photometry areas have abnormally high reflected light luminance values D(i) due to regular reflection of preliminarily emitted light by a high-reflective member such as a glass or mirror surface. Let MNR be the calculated average value of the top n (predetermined number of) reflected light luminance values.

In step S156, the controller 41 compares the calculated value MNR with the predetermined value LVL0 calculated in step S153 according to:

$$MNR > LVL0 + C10$$

The control reaches this step when the currently mounted image capture lens 2 does not have any distance encoder 56, as determined in step S154. In this case, the initial value of the value LVL0 has been determined with reference to table1 shown in FIG. 8 based on the focal length information of the image capture lens 2 in step S153.

Note that C10 is an empirically determined adjustment value. For example, if it is determined that the value MNR is larger than the predetermined value LVL0 by one level or more, C10 is set to be 1. If it is determined that MNR is larger than LVL0+C10, the process advances to step S157.

In step S157, the controller 41 re-calculates the predetermined value LVL0 based on the value MNR (second calculation) by:

$$LVL0 = MNR \times C11 + C12$$

A meaning of MNR>LVL0+C10 will be explained below. Such state is set when practical distances to a principal object are smaller than the assumed distance based on a focal length in many photometry areas of the AE sensor 26. That is, this state means that the user makes an image capture operation at a very close distance to the principal object at a high possibility. The assumed distances based on respective focal lengths shown in FIG. 8 are set to be distances where a principal object is located at a relatively high possibility when an image capture operation is made in states of the corresponding focal lengths. Hence, the user may make an image capture operation to have an object located at a distance shorter than the assumed distance as a principal object depending on his or her intention.

In such state, when the main light emission amount is determined in step S158 and subsequent steps, smaller weighting coefficients for photometry areas including the principal object are set, and a proper light emission amount cannot be obtained. Hence, the predetermined value LVL0 is re-calculated based on the MNR value in this step. The predetermined value LVL0 re-calculated in this step assumes a value larger than that calculated in step S153. Note that C11 and C12 are empirically determined adjustment values. For example, when the value of C11 is set to be 1 and that of C12 is set to be 0, a value equal to the MNR value is set as the value LVL0.

In step S158, the controller 41 extracts areas where the reflected light luminance values D(i) fall within the predetermined range (between the upper limit value LVL0 and lower limit value LVL1) from the 35-divided photometry areas. Then, areas where the reflected light luminance values D(i) are abnormally high due to regular reflection from a high reflective member such as a glass or mirror surface, and areas where the reflected light luminance values D(i) are very low since an object is too distant for the preliminarily emitted light to reach are excluded, thus extracting areas where a principal object is likely to exist.

In step S159, the controller 41 judges that an object at the closest distance of the extracted photometry areas is more likely to be a principal object, and selects, as a reference area, an area where the ratio R(i) between the luminance value P(i) immediately before preliminary light emission and luminance value H(i) at the time of preliminary light emission assumes a maximum value. The value of R(i) in that reference area is called a reference value baseR, and an area where the reference value baseR and the value R(i) indicate the same value is determined as a principal object area.

In step S160, the controller 41 calculates differences RR(i) between the luminance value ratios R(i) and the reference value baseR in all the photometry areas of i=1 to 35.

$$RR(i)=baseR-R(i)$$

Since both the luminance value ratios R(i) and reference value baseR are those in the compressed system, the differences RR(i) are to calculate ratios between R(i) of the reference area and those of other areas. An area with a small RR(i) value can be considered as that where an object having a distance nearly equal to that which exists in the principal object area exists. On the other hand, an area with an RR(i) value, which is large in a positive direction, can be considered as that where an object farther than the object which exists in the principal object area exists. Conversely, an area with an RR(i) value, which is large in a negative direction, can be considered as that where an object closer than the object which exists in the principal object area exists.

Figure 9:
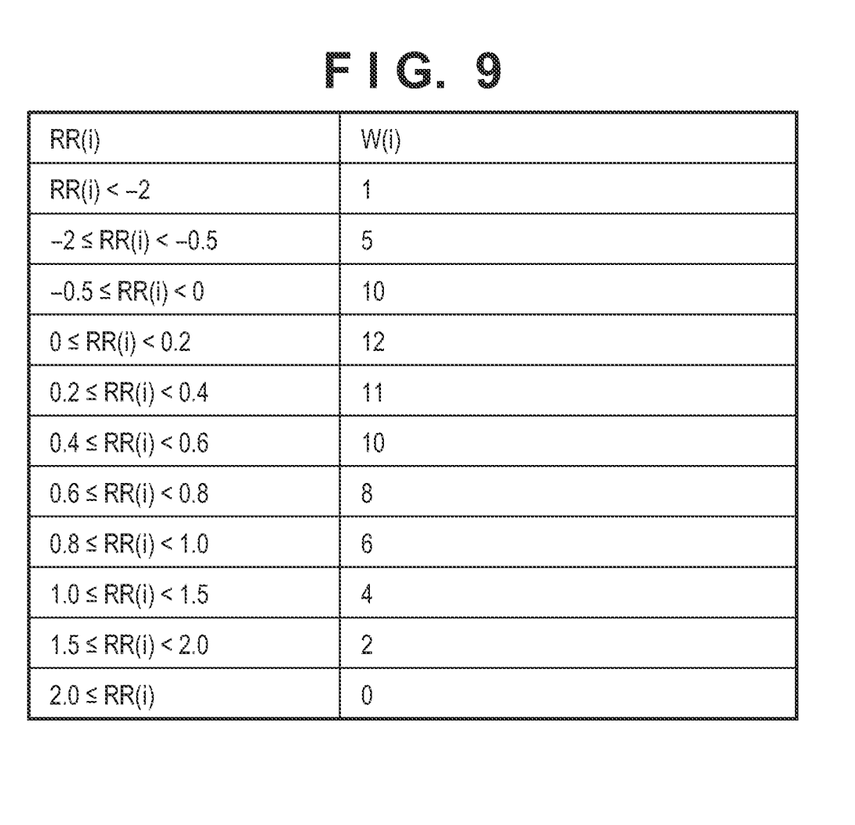
FIG. 9 is an explanatory view of a W(i) value determination table.

In step S161, the controller 41 determines weighting coefficients W(i) in accordance with the RR(i) values calculated in all the photometry areas of i=1 to 35. More specifically, the coefficients W(i) are calculated from table2 shown in FIG. 9 based on the RR(i) values of the respective photometry areas.

$$W(i)=\text{table2}(RR(i))$$

According to table2, to an area with an RR(i) value, which is equal to the reference value baseR, a maximum weighting value=12 is given as W(i). To areas where the RR(i) values are equal or very closer to the reference value baseR, larger values are given as W(i). This is because such area is considered as the principal object area or an area where an object having a distance nearly equal to that to the principal object exists. As the absolute value of the RR(i) value becomes larger than zero, the weighting coefficient W(i) given to that area is gradually decreased. This is because such area is more likely to be that where an object different from the principal object exists. In this manner, calculations of a main light emission amount in the next and subsequent steps are executed by giving the weighting coefficients in accordance with distances to objects which exist in the respective photometry areas, thus calculating a proper main light emission amount for the principal object. Even when the principal object position in a frame moves every time an image is captured or when an image of an identical scene is captured by slightly changing a composition, nearly the same main light emission amounts are calculated, thus preventing different main light emission amounts from being calculated for respective images.

In step S162, the controller 41 makes a weighted calculation of reflected light components of objects in all the photometry areas of i=1 to 35.

$$AVE=\Sigma(D(i)\times W(i))/\Sigma W(i)$$

With this weighted calculation, an average value AVE of the reflected light luminance values D(i) on the entire frame, which are weighted by larger values in the principal object area and areas where objects having distances nearly equal to that to an object in the principal object area exist.

In step S163, the controller 41 calculates a main light emission amount G from the value EVT determined in step S106 and the value AVE calculated in step S162.

$$G=EVT-AVE$$

G is a relative value of main light emission with respect to a light emission amount at the time of preliminary light emission.

The G value is sent from the controller 41 to the flash controller 61 via a communication, and main light emission is made by a light emission amount according to this value in step S111.

As described above, when information associated with an object distance cannot be obtained from the mounted image capture lens, a condition required to determine a reference area used to determine weighting coefficients from the plurality of photometry areas is changed based on the photometry results at the time of preliminary light emission. More specifically, the reference area used to determine the weighting coefficients from the plurality of photometry areas is extracted from areas where luminance values of reflected light components at the time of preliminary light emission fall within the predetermined range. The predetermined range at that time is changed based on the photometry results at the time of preliminary light emission. Still more specifically, when the average value of top n luminance values of the areas where luminance values of reflected light components at the time of preliminary light emission are large is larger than a threshold based on the upper limit value of the predetermined range, the upper limit value of the predetermined range is set to be larger than that when the average value is equal to or smaller than the threshold.

In this manner, even when information associated with an object distance cannot be obtained from the mounted image capture lens, the weighting coefficients of the plurality of photometry areas can be appropriately determined so as to set a large weighting coefficient for a principal object, thus allowing to calculate a proper main light emission amount.

(Second Embodiment)

Figure 7:
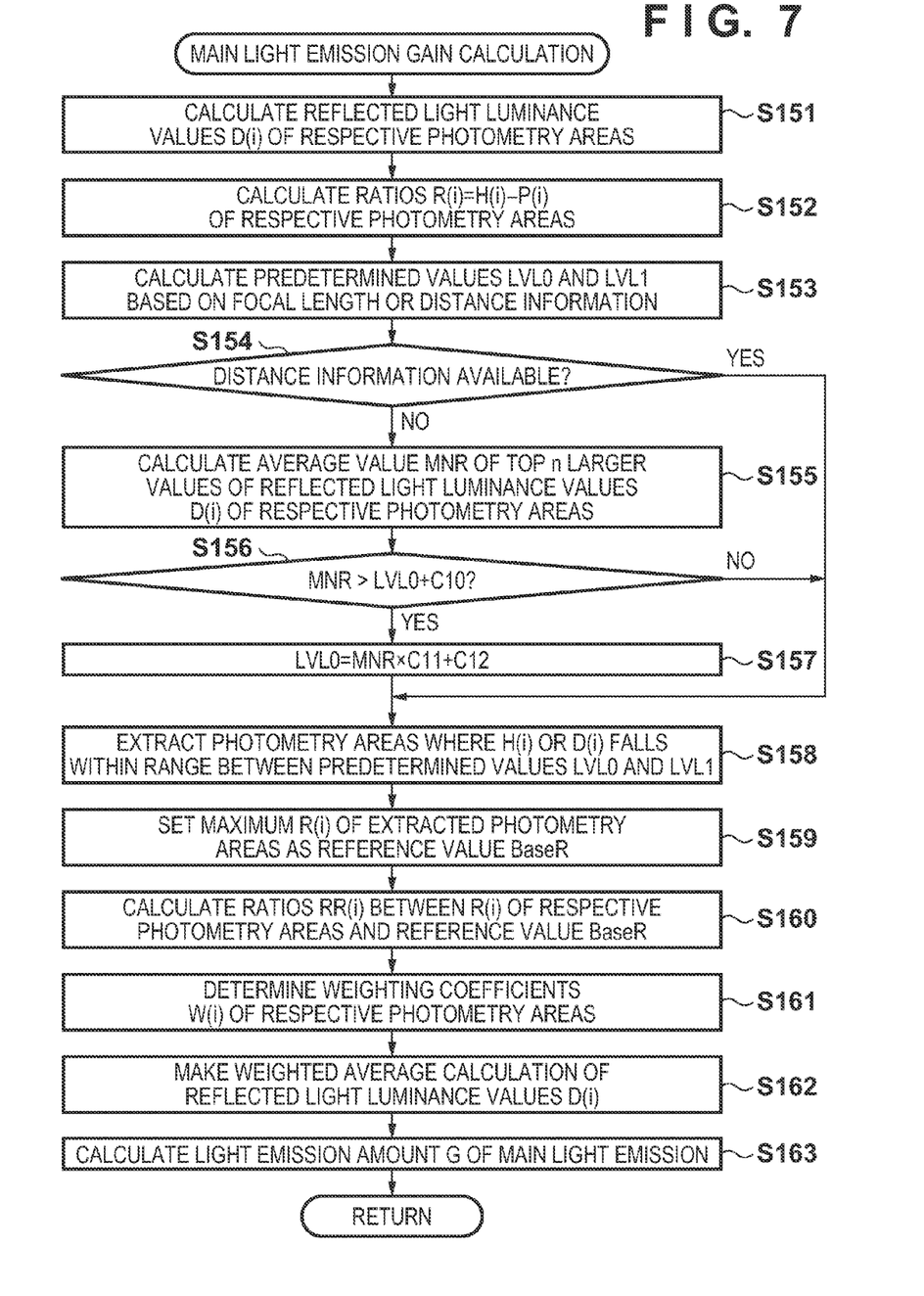
FIG. 7 is a flowchart showing the operation of the camera.

As for step S109 of the first embodiment, that is, the calculation processing for determining the main light emission amount of the flash described using the flowchart shown in FIG. 7, an embodiment for obtaining the same effects is not limited to that described above. The calculation processing of the second embodiment will be described below with reference to the flowchart shown in FIG. 10. Note that other arrangements and various kinds of processing in the second embodiment are the same as those in the first embodiment, and a description thereof will not be repeated.

Figure 10:
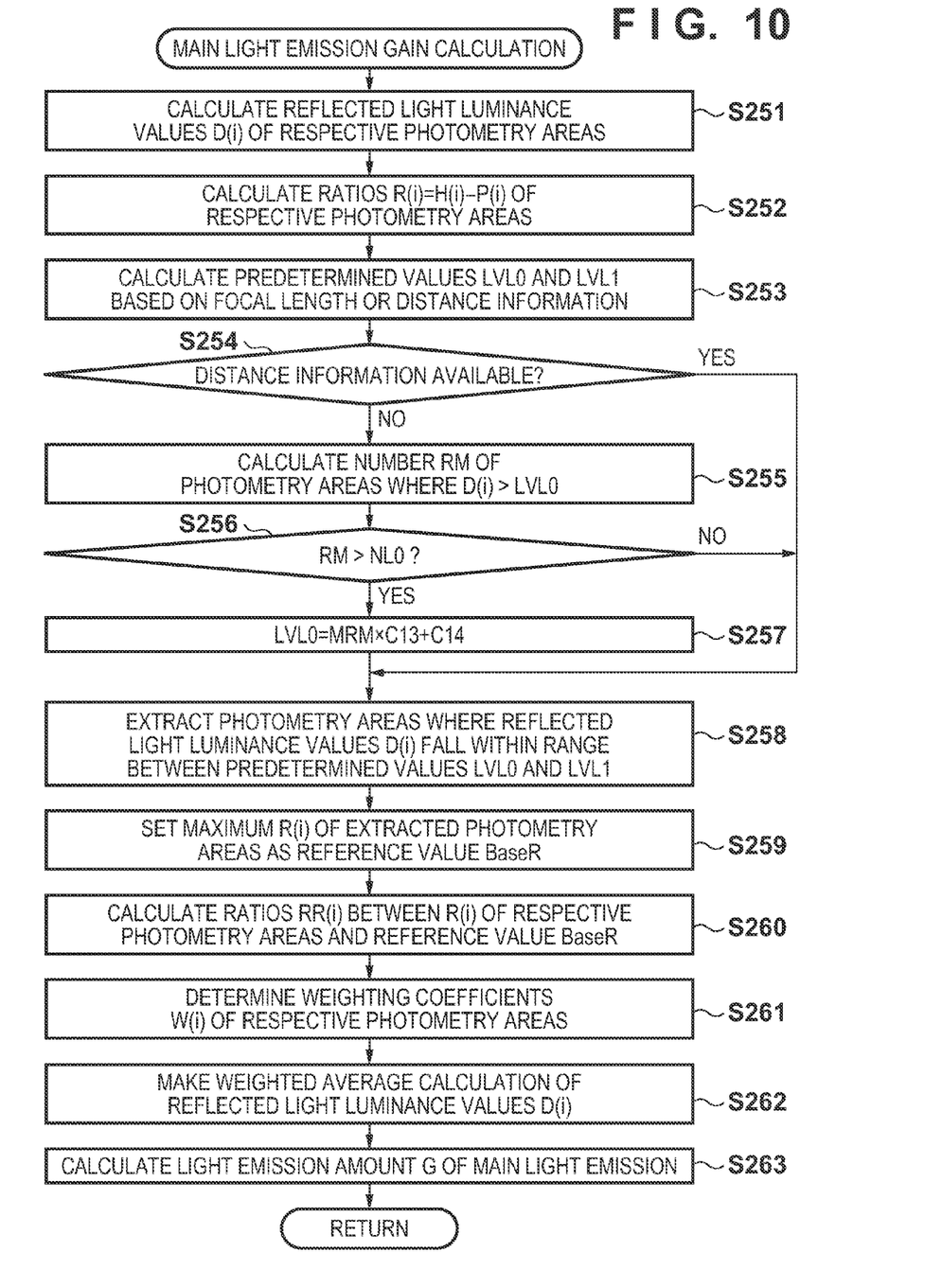
FIG. 10 is a flowchart showing the operation of a camera according to the second embodiment.

In the flowchart shown in FIG. 10, since the processes in steps S251 to S254 are the same as those in steps S151 to S154 in the flowchart shown in FIG. 7, a description thereof will not be repeated.

If various kinds of lens information acquired in step S102 do not include any distance information D, the process advances to step S255. In step S255, the controller 41 counts the number of photometry areas having the reflected light luminance values D(i), which are calculated in step S251 and exceed the predetermined value LVL0 calculated in step S253. Let RM be the count value.

The controller 41 checks in step S256 whether or not the count value RM is larger than a predetermined value NL0. The NL0 value is determined in advance to be, for example, 10, so that it assures an area ratio of about 20% or higher with respect to the number of divisions of the AE sensor 26. This is because it is not preferable to make a re-calculation of the predetermined value LVL0, which will be described in step S257 later, under a condition that some limited photometry areas have abnormally high reflected light luminance values D(i) due to regular reflection of preliminarily emitted light by a high reflective member such as a glass or mirror surface. If it is determined that the count value RM is larger than the predetermined value NL0, the process advances to step S257.

In step S257, the controller 41 re-calculates the predetermined value LVL0 based on an average value MRM of the reflected light luminance values D(i) of the photometry areas, for which it is determined in step S255 that these values D(i) exceed the predetermined value LVL0, using:

$$LVL0 = MRM \times C13 + C14$$

A meaning of the number of photometry areas having the reflected light luminance values D(i) larger than the predetermined value LVL0>the predetermined value NL0 will be described below. Such state is set when practical distances to a principal object are smaller than the assumed distance based on a focal length in many photometry areas of the AE sensor 26. That is, this state means that the user makes an image capture operation at a very close distance to the principal object at a high possibility. The assumed distances based on respective focal lengths shown in FIG. 8 are set to be distances where a principal object is located at a relatively high possibility when an image capture operation is made in states of the corresponding focal lengths. Hence, the user may make an image capture operation to have an object located at a distance shorter than the assumed distance as a principal object depending on his or her intention.

In such state, when the main light emission amount is determined in step S258 and subsequent steps, smaller weighting coefficients for photometry areas including the principal object are set, and a proper light emission amount cannot be obtained. Hence, the predetermined value LVL0 is re-calculated based on the MRM value in this step. The predetermined value LVL0 re-calculated in this step assumes a value larger than that calculated in step S253. Note that C13 and C14 are empirically determined adjustment values. For example, when the value of C13 is set to be 1 and that of C14 is set to be 0, a value equal to the MRM value is set as the value LVL0.

Since the processes in subsequent steps S258 to S263 are the same as those in steps S158 to S163 in the flowchart shown in FIG. 7, a description thereof will not be repeated.

As described above, when information associated with an object distance cannot be obtained from the mounted image capture lens, a condition required to determine a reference area used to determine weighting coefficients from the plurality of photometry areas is changed based on the photometry results obtained by making preliminary light emission. More specifically, the reference area used to determine the weighting coefficients from the plurality of photometry areas is extracted from areas where luminance values of reflected light components at the time of preliminary light emission fall within the predetermined range. The predetermined range at that time is changed based on the photometry results obtained by making preliminary light emission. Still more specifically, the number of areas having the luminance values of reflected components at the time of preliminary light emission, which exceed the upper limit value of the predetermined range, of the plurality of photometry areas, is counted. When the count value is larger than the predetermined value, the upper limit value of the predetermined range is set to be larger than that when the count value is equal to or smaller than the predetermined value.

In this manner, even when information associated with an object distance cannot be obtained from the mounted image capture lens, the weighting coefficients of the plurality of photometry areas can be appropriately determined so as to set a large weighting coefficient for a principal object, thus allowing to calculate a proper main light emission amount.

Note that the aforementioned two embodiments adopt the arrangement in which upon extracting areas as candidates of the principal object area from the plurality of photometry areas, they are extracted from areas having luminance values of reflected light components at the time of preliminary light emission, which fall within the predetermined range. Alternatively, an arrangement in which areas having luminance values of reflected light components, which are equal to or smaller than a predetermined value, are extracted, may be adopted. In this case, in the same manner as in the case in which the upper limit value of the predetermined range is changed, the predetermined value can be changed from its initial value based on photometry results obtained by making preliminary light emission.

The aforementioned two embodiment adopt the arrangement in which the upper limit value of the predetermined range used upon extracting from areas having luminance values of reflected light components at the time of preliminary light emission, which fall within the predetermined range, is changed based on the photometry results obtained by making preliminary light emission. Alternatively, an arrangement in which the lower limit value of the predetermined range is also changed may be adopted. For example, upon increasing the upper limit value of the predetermined range, the lower limit value is also increased according to an increment of the upper limit value. That is, the entire predetermined area may be shifted to increase the values. By shifting the entire predetermined range based on the photometry results obtained by making preliminary light emission, areas as candidates of the principal object area can be extracted more accurately.

In the aforementioned two embodiments, luminance values of reflected light components at the time of preliminary light emission are calculated based on luminance values obtained immediately before preliminary light emission and those obtained by making preliminary light emission. Alternatively, luminance values obtained immediately after preliminary light emission may be used in place of those obtained immediately before preliminary light emission. Alternatively, when luminance values obtained immediately before preliminary light emission have negligible levels, luminance values obtained by making preliminary light emission may be considered as those of reflected light components at the time of preliminary light emission.

The aforementioned two embodiments adopt the arrangement in which areas as candidates of the principal object area are extracted from those where luminance values of reflected light components at the time of preliminary light emission fall within the predetermined range. However, the present invention is applicable to a case of processing other than such extraction processing. For example, the present invention may be applied to a case in which weighting coefficients of areas where luminance values of reflected light components at the time of preliminary light emission fall outside the predetermined range of the plurality of photometry areas are set to be lower than those of areas where luminance values of reflected light components at the time of preliminary light emission fall within the predetermined range. Alternatively, the present invention may be applied to a case in which areas where luminance values of reflected light components at the time of preliminary light emission fall outside the predetermined range are not used in the main light emission amount calculation.

The aforementioned two embodiments adopt the arrangement in which information associated with an object distance is acquired from the mounted image capture lens. However, the present invention is applicable to an arrangement in which information associated with an object distance is acquired by other methods. For example, in an arrangement in which an area where a principal object exists is detected from a captured image, and a distance to the principal object is calculated based on the size of the detected area, when the area where the principal object exists cannot be detected, the present invention may be applied.

In the aforementioned two embodiments, at least some of processes, which are executed by the controller of the camera and are associated with the present invention, may be executed by the flash controller.

In the aforementioned two embodiments, when no areas where the luminance values of reflected light components at the time of preliminary light emission fall within the predetermined range are detected, the same weighting coefficient may be set for the plurality of photometry areas.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-014385 filed Jan. 26, 2011 which is hereby incorporated by reference herein in its entirety.

What is claimed is:

1. An image capture apparatus comprising:
a photometry unit which acquires photometric values of a plurality of photometry areas;
an acquisition unit which acquires information associated with an object distance;
a determination unit which determines weighting coefficients for the plurality of photometry areas; and
a calculation unit which calculates a main light emission amount of a light-emitting device by weighting the photometric values of the plurality of photometry areas according to the weighting coefficients determined by said determination unit,
wherein said determination unit determines a reference area, used to determine the weighting coefficients, from areas where values based on the photometric values obtained by controlling the light-emitting device to preliminarily emit light are not more than a reference value, and
wherein when said acquisition unit cannot acquire the information, said determination unit changes the reference value such that when an average value of a predetermined number of top larger values of the values based on the photometric values of the plurality of photometry areas obtained by controlling the light-emitting device to preliminarily emit light is larger than a threshold based on the reference value, the reference value is set to be larger than the reference value to be set when the average value is not more than the threshold.

2. The apparatus according to claim 1, wherein the values based on the photometric values are values based on differences between photometric values obtained by controlling the light-emitting device to preliminarily emit light and photometric values obtained by controlling the light-emitting device not to emit light.

3. The apparatus according to claim 1, wherein when said acquisition unit can acquire the information, an initial value of the reference value is set based on the information, and when said acquisition unit cannot acquire the information, the initial value is set based on a focal length of said image capture apparatus.

4. The apparatus according to claim 1, wherein when said acquisition unit can acquire the information, said determination unit does not set the reference value based on the photometric values of the plurality of photometry areas obtained by controlling the light-emitting device to preliminarily emit light.

5. A control method of an image capture apparatus, which comprises a photometry unit which acquires photometric values of the plurality of photometry areas, the method comprising:
an acquisition step of acquiring information associated with an object distance;
a determination step of determining weighting coefficients for the plurality of photometry areas; and
a calculation step of calculating a main light emission amount of a light-emitting device by weighting the photometric values of the plurality of photometry areas according to the weighting coefficients determined in the determination step,
wherein in the determination step, a reference area used to determine the weighting coefficients is determined from areas where values based on the photometric values obtained by controlling the light-emitting device to preliminarily emit light are not more than a reference value, and when the information cannot be acquired in the acquisition step, the reference value is changed such that when an average value of a predetermined number of top larger values of the values based on the photometric values of the plurality of photometry areas obtained by controlling the light-emitting device to preliminarily emit light is larger than a threshold based on the reference value, the reference value is set to be larger than the reference value to be set when the average value is not more than the threshold.

* * * * *